United States Patent [19]
Thomson

[11] Patent Number: 5,987,530
[45] Date of Patent: Nov. 16, 1999

[54] METHOD FOR CACHING DATA AND GENERATING ONLY ONE READ REQUEST TO READ THE REQUESTED DATA AND ADDITIONAL DATA IN UNIVERSAL SERIAL BUS SYSTEM

[75] Inventor: Andrew Thomson, Austin, Tex.

[73] Assignee: National Instruments Coporation, Austin, Tex.

[21] Appl. No.: 08/889,996

[22] Filed: Jul. 10, 1997

[51] Int. Cl.[6] .................................................. G06F 13/14
[52] U.S. Cl. ............................ 710/4; 710/20; 710/52; 711/118
[58] Field of Search ........................... 395/823, 425, 395/408, 800; 710/52, 53, 4, 20; 711/118, 141; 712/29

[56] References Cited

U.S. PATENT DOCUMENTS

| | | | |
|---|---|---|---|
| 4,258,418 | 3/1981 | Heath | 710/53 |
| 4,805,094 | 2/1989 | Oye et al. | 710/53 |
| 4,860,292 | 8/1989 | Newman et al. | 714/748 |
| 5,163,132 | 11/1992 | DuLac et al. | 710/53 |
| 5,224,213 | 6/1993 | Dieffenderfer et al. | 710/53 |
| 5,239,644 | 8/1993 | Seki et al. | 395/425 |
| 5,394,531 | 2/1995 | Smith | 395/425 |
| 5,487,171 | 1/1996 | Dodt et al. | 710/20 |
| 5,539,915 | 7/1996 | Burton et al. | 710/21 |
| 5,590,310 | 12/1996 | Willenz et al. | 711/148 |
| 5,594,926 | 1/1997 | Chang et al. | 710/352 |
| 5,604,843 | 2/1997 | Shaw et al. | 395/101 |
| 5,619,723 | 4/1997 | Jones et al. | 710/3 |
| 5,630,166 | 5/1997 | Gamache et al. | 395/800 |
| 5,651,137 | 7/1997 | MacWilliams et al. | 395/468 |
| 5,793,992 | 8/1998 | Steele et al. | 710/113 |
| 5,832,300 | 11/1998 | Lowthert | 710/33 |
| 5,845,152 | 12/1998 | Anderson et al. | 710/52 |

OTHER PUBLICATIONS

Universal Serial Bus Specification, Revision 0.9, Mar. 31, 1995, pp.1–25.
Universal Serial Bus Bulletin, vol. 2, No. 3, Aug. 1996, pp. 1–8.

*Primary Examiner*—Thomas C. Lee
*Assistant Examiner*—Harold Kim
*Attorney, Agent, or Firm*—Conley, Rose & Tayon; Jeffrey C. Hood; Eric A. Stephenson

[57] ABSTRACT

An apparatus and method is provided for caching data in a universal serial bus (USB) system. In one embodiment, the present invention employs a host computer coupled to an I/O device via a USB. The host computer includes a data cache for storing data retrieved from the I/O device. The data cache allows data to be returned to the host computer upon request without accessing the I/O device via a USB transaction. A cacheability look-up table and cache table are provided to ensure the integrity of data returned to the host computer. Requested data is returned from the I/O device if the cacheability look-up table indicates the requested data is noncacheable. Data is returned from the data cache if the cache table indicates the requested data is available in the cache as valid data. If the cache table indicates the requested data is not available in the cache as valid data, the requested data is returned from the I/O device along with data stored in predetermined I/O device addresses. The additional data is stored in the cache for subsequent access by the host computer. By returning data from the cache, the present invention reduces the response time and reduces the traffic over the USB between the host computer and I/O device.

28 Claims, 6 Drawing Sheets

METHOD FOR CACHING DATA AND GENERATING ONLY ONE READ REQUEST TO READ THE REQUESTED DATA AND ADDITIONAL DATA IN UNIVERSAL SERIAL BUS SYSTEM

BACKGROUND OF THE INVENTION

1. Field of the Invention

The present invention generally relates to the art of universal serial bus (USB) systems, and more particularly to a method and apparatus for read caching data from peripheral devices coupled to a USB.

2. Description of the Relevant Art

The USB specification is a proposed standard recently promelgated by a group of companies including Compaq Computer Corporation, Digital Equipment Corporation, International Business Machines Corporation, Intel Corporation, Microsoft Corporation, and Northern Telecom Limited. Described below are various aspects of the USB relevant to a complete understanding of the present invention. Further background concerning the USB may be obtained from USB Specification, Revision 1.0 which is incorporated herein by reference.

The USB is a cable bus which supports data exchange between a host computer and a wide range of peripheral devices. The USB provides two wire, point-to-point signaling in which the signals are differentially driven at a bit rate of 12 megabits per second.

USB systems are generally defined in terms of (1) interconnects, (2) devices, and (3) hosts. The USB interconnect defines the manner in which the USB devices are connected to and communicate with the USB host. There is generally only one host on any USB system. A USB interface to the host computer system is referred to as the host controller. The host controller may be implemented in a combination of hardware, firmware, or software. USB devices are defined as (1) hubs, which provide additional attachment points to the USB, or (2) functions, which provide capabilities to the system; e.g., an ISDN connection, a digital joystick, or speakers. Hubs indicate the attachment or removal of a USB device in its per port status bit. The host determines if a newly attached USB device is a hub or a function and assigns a unique USB address to the USB device. All USB devices are accessed by a unique USB address. Each device additionally supports one or more endpoints with which the host may communicate. The remaining description will be limited to USB devices defined as functions.

The USB supports functional data and control exchange between the USB host and USB devices. USB data transfers take place between host software and a particular endpoint on a USB device. The USB architecture comprehends three basic types of data transfer: (1) isochronous or streaming real time data which occupies a prenegotiated amount of USB bandwidth with a prenegotiated latency; (2) asynchronous interactive data such as characters or coordinates with human perceptible echo or feedback response characteristics, and; (3) asynchronous block transfer data which is generated or consumed in relatively large and bursty quantities and has wide dynamic latitude and transmission constraints.

The USB host interacts with USB devices through the host controller. The host controller is responsible for detecting the attachment and removal of USB devices, managing control flow between the host and USB devices, managing data flow between the host and USB devices, collecting status and activity statistics, and providing a limited amount of power to attached USB devices. The USB system software on the host manages interactions between the USB devices and device software. There are five areas of interactions between the USB system software and device software. They include: (1) device enumeration and configuration; (2) isochronous data transfers; (3) asynchronous data transfers; (4) power management, and; (5) device and bus management information.

Bus transactions including data transfers generally involve the transmission of three different packets, e.g. Token, Data, and Handshake. All packets begin with a SYNC field, which is used by input circuitry to align incoming data with a local clock. A packet identifier (PID) immediately follows the SYNC field of every USB packet. The PID consists of a four-bit ID field followed by a four-bit check field. The PID indicates the type of packet (e.g., Token, Data, and Handshake) and the format of the packet along with the type of variant detection applied to the packet. The four-bit check field of the PID insures reliable decoding.

Token packets include an ADDR field which specifies the target USB device, via its USB address, that is the source or destination of a Data packet, depending on the value of the Token PID. USB devices must perform a complete decoding of the ADDR field.

A Data packet includes a data field which may range from zero to N bytes and must be in integral numbers of bytes. Data bits within each byte are shifted out most significant bit first. The data field of a Data packet is divided into fields which give extra information to the USB device regarding the request being made. One field, the command code, tells what the targeted USB device should do, such as set up a read from a USB device space or set up a write to a USB device space. The read space command is used to request information from a given location in a given space of a USB device. The command is used to set up the read, which is followed by a request from the host for the USB device to send data. The USB device then sends the data it has retrieved from the previously specified space. The write space uses exactly the same definition as the read space. However, the Data packet contains data transferred by the host to the USB device.

Handshake packets consist of only a PID. Handshake packets are used to report the status of a data transfer, and can return values indicating successful reception of data, CRC failure, flow control, and certain fault conditions.

Each data transfer begins when the host controller, on a scheduled basis, sends a Token packet describing the type of transfer (e.g. write to or read from USB device), the USB address of the targeted USB device, and an endpoint number therein. The USB device addressed in the Token Packet selects itself by decoding the appropriate address field ADDR. In any given data transfer, data is transferred either from the host to a device (e.g. write data transfer) or from a device to the host (e.g. read data transfer) depending on the Token Packets PID.

In the case where the host sends or writes data, the target USB device decodes the incoming Token's ADDR. If the USB device's address matches ADDR of the Token, the USB device accepts a subsequent host provided Data packet containing write data and internal USB addresses where the data is to be written. At the end of the transmission, the USB device performs a CRC check over the data portion of the packet and uses the result to determine if the data transfer was successful. The USB device replies with a Handshake which informs the host of the outcome.

In the case where the host seeks to read data from a USB device, the host must issue two sets of packets. The first set of packets is used to set up the read operation in the USB device. The second set of packets is used to actually send the requested data to the host. If the decoded address in the first Token matches that assigned to the targeted USB device, the targeted USB device is alerted that the host will send a Data packet containing the command codes necessary for setting up the read operation in the device. Subsequent thereto, the host issues the Data packet containing those command codes. The command codes include the address or addresses internal to the targeted USB device where the requested data is stored. The targeted USB device returns a Handshake acknowledging proper receipt of the first Data packet while requested data is being transfered to a packet buffer. The host then issues a second Token packet requesting the targeted USB device to send data. In response, the USB sends the Data packet containing the requested data. Finally, the host device transmits a Handshake packet to the targeted USB device acknowledging proper receipt of the requested data.

USB devices have two different kinds of logical buffers: packet buffer and elasticity buffer. The host never directly accesses these buffers. However, the characteristics of these buffers must be known to the host in order for the correct bounds for packet sizes to be established. The packet buffer determines the maximum packet size which the USB device can receive or send. This is conceptually a "latch" directly attached to a USB interface which initially receives packets from and sends packets to the USB. From here, the USB device will appropriately dispatch to other areas within the USB device, data received from the host, or dispatch to the host a packet containing data received from the other areas within the USB device, depending on commands received the host and the USB device's internal division of labor.

Port consolidation for existing devices is a primary goal for USB. It follows that existing peripheral devices like GPIB controller IC's, serial UART's, or DAQ circuitries will migrate to the USB in the future to free up much needed port/connector space and to reduce form factors. Port consolidation of existing devices will occur gradually over time. To facilitate the acceptance of USB as the primary bus, a mechanism must be provided which supports existing devices and their protocol on the USB.

Figure 1:
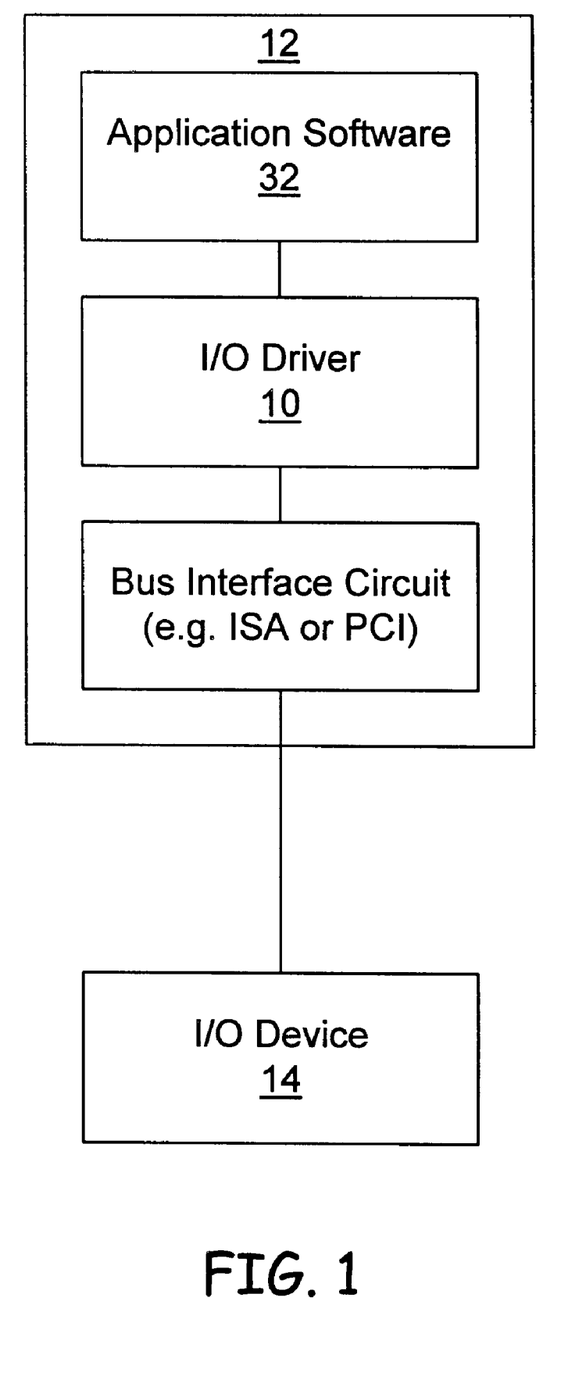
FIG. 1 is a block diagram representing a prior art non-USB based system.

FIG. 1 shows a pre-USB system in which an I/O driver 10 of a host computer 12 is coupled to a peripheral I/O device 14 via, for example, a PCI or ISA bus interface circuit. The I/O device 14 could be almost any register based circuitry (for example, a GPIB controller IC, serial UART, or DAQ circuitry). This system implements a register based communication wherein I/O driver 10 models the I/O device 14 as a group of hardware registers. In this configuration, the I/O driver 10 accesses I/O device 14 by issuing individual requests to read or write data to one of the registers in I/O device 14. The I/O device quickly responds by returning the requested register data or writing to the designated register.

Figure 2:
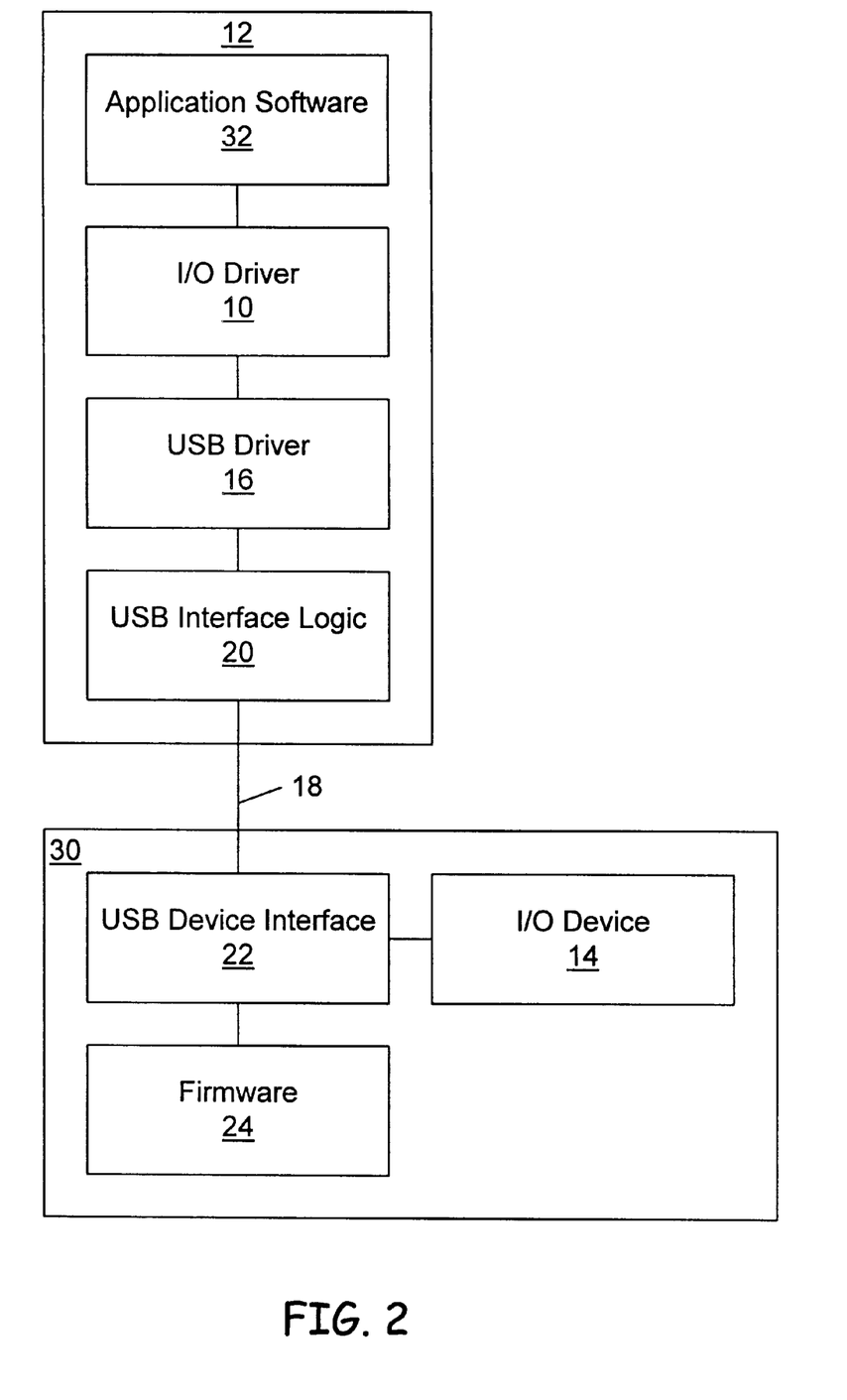
FIG. 2 is a block diagram representing a prior art USB system.

FIG. 2 shows the system of FIG. 1 supported for communication over a USB 18. Host computer 12 includes the I/O driver 10 implemented in the non-USB system shown in FIG. 1. Additionally, host computer 12 includes a USB driver 16 and USB interface logic circuit 20. The I/O driver 10 continues to model the I/O device 14 as a group of registers. To access a hardware register in I/O device 14, however, the I/O driver first passes its read or write data request to the USB driver 16 which coordinates construction and transmission of the Token, Data and Handshake packets required by USB protocol for transferring data to or from the I/O device 14. CPU with USB port (device interface) 22 is connected to I/O device 22 and is configured by firmware 24 to act as an interface allowing I/O device 14 to communicate with the host via the USB. Device interface 22 receives and decodes incoming packets (e.g. host generated Token packets) and generates complimentary Data or Handshake packets needed to complete a data transfer between I/O device 14 and host computer 12.

While the USB driver 16 and USB logic circuit 20 allow host computer 12 to communicate with I/O device 14 via USB 18, the I/O driver 10 still maintains its pre-USB protocol of modeling the I/O device 12 as a group of hardware registers. Each read or write request requires its own individual bus transaction for completion. Given that each USB bus transaction involves one or more sets of packets (Token, Data, Handshake) a significant amount of system overhead is required to for each read or write request generated by the USB based system of FIG. 2. This is particularly true when comparing the overhead of bus transfer for the non-USB system of FIG. 1. The increase in system overhead, in turn, limits the speed at which data communication is effectuated between the host computer 12 and the I/O device 14 shown in FIG. 2.

SUMMARY OF THE INVENTION

The present invention comprises a universal serial bus (USB) system which solves the above identified problems and others. The present invention comprises a host computer coupled to I/O devices via a USB. The host computer includes a cache for storing data returned from one of the I/O devices. The present invention decreases response time for requests for data generated by the host computer while reducing overall USB traffic.

The host computer generates individual requests to read data stored in memory of the I/O device. It is understood that memory in the I/O device may include registers, cache or other storage devices. Rather than just returning the requested data, the present invention accesses a predetermined number of memory locations within the I/O device and returns data stored therein to the host computer cache for storage. Subsequent host computer generated requests for data can be fulfilled using the data stored in the cache.

To facilitate integrity of returned data via the data cache, the host computer creates and uses a cacheability look-up table and cache table in connection with each read data request. The cacheability look-up table identifies those I/O device memory locations which contain cacheable data. If the cacheability look-up table indicates that data requested by the host computer is contained in a noncacheable memory location, the host computer bypasses the data cache and accesses the data in the I/O device through a USB transaction. The cache table is used to identify the availability and validity of data stored in the cache. If the cache table indicates that data requested by the host computer is validly available in the cache, the requested data is returned from the cache, thereby avoiding a USB transaction to access the requested data directly from the I/O device.

The present invention comprises a USB mini-driver coupled between an I/O driver and a USB driver. The USB mini-driver is configured to receive an I/O driver request for data stored in the I/O device. USB mini-driver accesses the cacheability look-up table and cache table to determine whether the requested data is cacheable and whether the requested data is stored within the host computer cache as valid data. If the requested data is noncacheable, the USB mini-driver prompts the USB driver to initiate a USB transaction to retrieve the requested data from the I/O device. If the requested data is cacheable and contained within the cache as valid data, the USB mini-driver returns the requested data to the I/O driver without accessing the I/O device via a USB transaction. If the requested data is cacheable but not contained within the cache as valid data, then the USB mini-driver prompts the USB driver to initiate a USB transaction to retrieve data contained in predetermined memory locations within the I/O device.

One advantage of the present invention is that it improves the response time for returning data requested by the host computer.

Another advantage of the present invention is that it reduces USB traffic between the host computer and an I/O device.

Yet another advantage of the present invention is that it enhances data transfer between the host computer's and I/O device without reconfiguring the host computer's application software and I/O driver.

BRIEF DESCRIPTION OF THE DRAWINGS

A better understanding of the present invention can be obtained when the following detailed description of the preferred embodiment is considered in conjunction with the following diagrams in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 3:
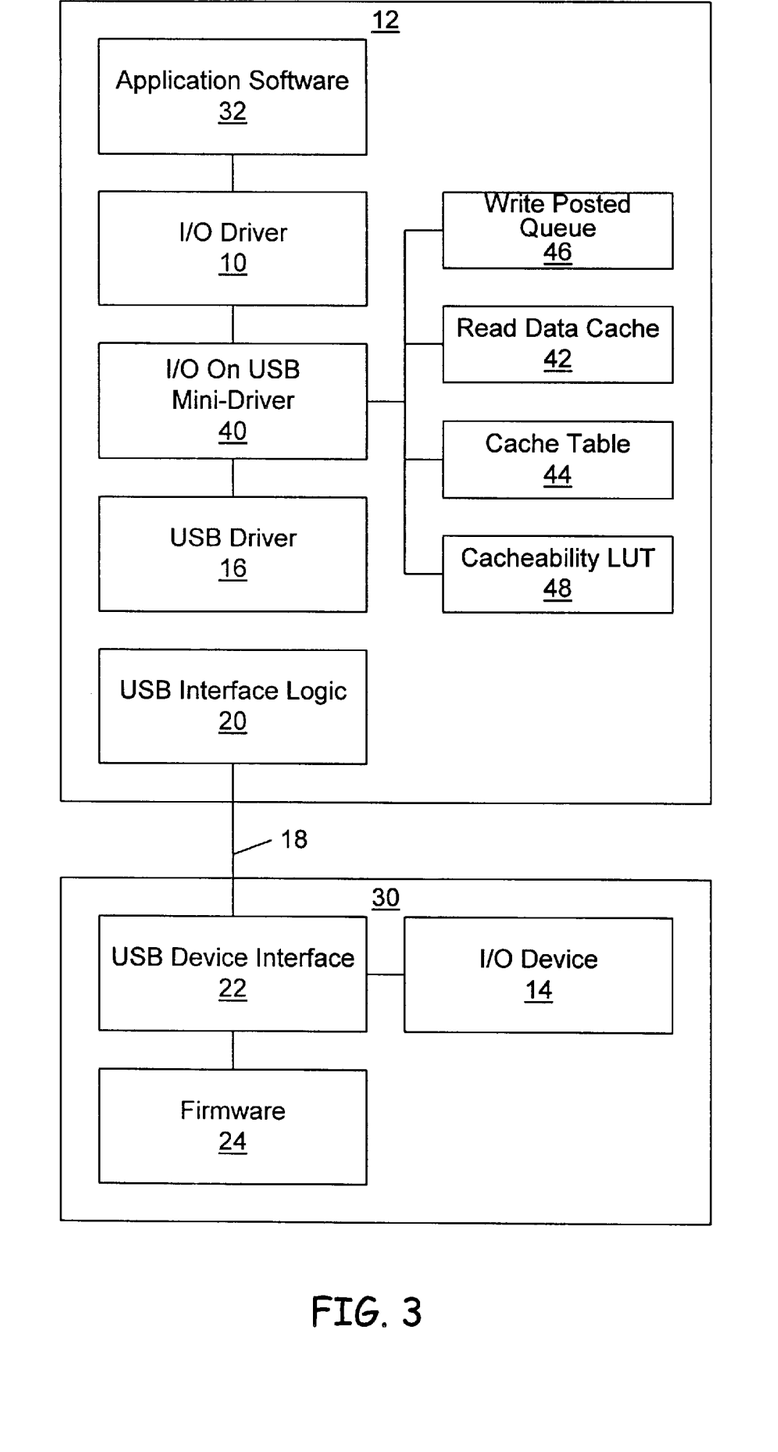
FIG. 3 is a block diagram representing a USB system employing the present invention.

FIG. 3 shows a USB system employing the present invention. More particularly, FIG. 3 shows a host computer 12 connected, via USB bus 18, to a single USB device 30. However, the invention should not be limited thereto it being understood that the present invention has application to host computer 12 connected to several USB devices 30 via USB 18.

Host computer 12 is configured to execute application software 32. Host computer 12 includes: I/O driver 10; USB driver 16; USB interface logic circuit 20; I/O on USB mini-driver (USB mini-driver) 40; read data cache 42; cache table 44; write posted queue 46, and; cacheability look-up table (LUT) 48.

In one embodiment, I/O driver 10, USB mini-driver 40, and USB driver 16 are implemented in software which is executed by host computer 12. It is to be understood, however, that these components can be implemented in hardware or a combination of hardware and software. Further, cacheability LUT 48, posted write queue 46, read data cache 42, and cache table 44 are implemented in main memory (not shown) of host computer 12, it being understood that these components can be implemented in anyone of a number of different types of memory devices separate and apart from main memory of host computer 12.

USB device 30 includes: device interface 22 which, in one embodiment, is a CPU with a USB port; firmware 24, and; I/O device 14. I/O device 14 includes registers or memory modeled as registers (not shown) for storing data, wherein the registers are accessible by interface 22 acting in accordance with firmware 24 and commands received from host computer 12.

I/O driver 10 generates access requests compatible with I/O device 14 to read and write to registers of I/O device 14 in accordance with corresponding requests generated by application software 32. I/O driver 10 is configured to model I/O device 14 as a group of hardware registers wherein each write or read request generated by I/O driver 10 is directed to accessing one of several hardware registers. To access any of the registers in I/O device 14, I/O driver 10 in general must first pass its read or write requests to the combination of USB mini-driver 40, USB driver 16, and USB logic circuit 20 which, coupled in series, acts as a USB interface to I/O driver 10. This interface generally allows application software 32 and I/O driver 10 to operate in a USB system without reconfiguration of the application software 32 and I/O driver 10.

Mini-driver 40 is coupled to posted writes queue 46, cacheability LUT 48, read data cache 42, and cache table 44. Mini-driver 40 operates in response to read or write requests generated by I/O driver 10. The posted writes queue 46, cacheability LUT 48, read data cache 42 and cache table 44 operate in connection with USB mini-driver 40 to ensure that only reliable, up-to-date data is provided to application software 32 upon read request as will be more fully explained below.

The posted writes queue 46 stores one or more I/O driver 10 requests to write data to registers in I/O device 14. In general, posted writes queue 46 should be configured so that posted write requests are flushed out in the order they were received. This ensures that data will be subsequently written to registers of the I/O device 14 in the order in which they were stored in posted writes queue 46. Posted writes queue 46 is defined, in one embodiment, as a FIFO. Generally, USB mini-driver 40 diverts and stores each I/O driver write request in posted writes queue 46. The write requests are held in posted write queue 46 until the USB mini-driver 40 issues a flush queue command. In response to the flush queue command, the posted write requests are provided to USB driver 16 which initiates a USB transaction wherein data to be written to one or more registers of I/O device 14 in accordance with the poster write requests, is sent over USB 18 to USB device 30 in a single Data packet. Thus, USB mini-driver 40 operating in connection with the write posted queue 46 defers transmission of write requests until several can be collected and sent over USB 18 in a single data transfer. Advantageously, system overhead is lowered since data is written to several I/O device registers using a single Data packet and one bus transaction instead of separate bus transactions one for each write request generated by I/O driver 10. It is to be noted that the flush queue command is generated in response to I/O driver 10 generating a request to read data from one of the registers in I/O device 14. Because the flush queue sequence is initiated and completed prior to reading a register of I/O device 14, the present invention ensures the integrity of data returned to host computer 12.

Cacheability LUT 48 further ensures the integrity of data returned to host computer 12. Cacheability LUT 48 is accessed by USB mini-driver 40 using addresses of registers in I/O device 14 which contain requested data as will be more fully described below. Each of the registers in I/O device 14 can be classified in one of two groups: cacheable and noncacheable. Noncacheable registers include any register that can change the status of I/O device 14 by reading that register. An example of a noncacheable register is a FIFO. Noncacheable registers may also include unused or rarely accessed registers. All other registers of I/O device 14 are cacheable. Cacheability LUT 48 identifies which I/O device 14 registers are cacheable. The cacheability LUT operates to ensure that data requested from a noncacheable register is not returned from cache 42.

Read data cache 42, caches data of I/O device 14 registers for quick access by I/O driver 10. Cache table 44 identifies the contents of cache 42. Cache table 44 also identifies the validity of the cache 42 contents. Cache 42 allows data to be returned to I/O driver 10 upon request without a bus transaction. The read data cache 42 and cache table 44 are accessed by USB mini-driver 40 using addresses of I/O device 14 registers of the read requests. In operation, USB mini-driver 40 receives an I/O driver's request to read data stored in a register of I/O device 14. The mini-driver uses the register address of the read request to access cache able 44 to determine whether the requested data is validly cached in cache 42. If a cache hit occurs indicating valid data is stored in cache 42, USB mini-driver accesses cache 42 and returns the requested data rather than initiating a lengthy USB transaction to obtain the requested data directly from the target register of the I/O device 14. Accordingly, cache 42 increases the speed at which requested data is returned to I/O driver 10.

USB interface logic 20 provides the necessary hardware to allow USB driver 16 to communicate with USB 18 and USB device 30. Likewise, device interface 22, operating in combination with firmware 24 allows I/O device 14 to communicate with USB 18 and host computer 12. Device interface 22 is configured to receive and decode Token, Data, or Handshake packets transmitted over USB 18 by host computer 12. Interface 22 is also configured to generate complimentary Data and Handshake packets for communicating with host computer 12 via USB 18. Device interface 22 includes a packet buffer (not shown) for (1) storing data to be transmitted to host computer 12, or (2) for storing data received from host computer 12. Device interface 22 controls access to registers within I/O device 14 in accordance with commands received from host computer 12. More particularly, device interface 22, operating in connection with firmware 24, is configured to respond to register access commands including: readregister, readallregisters, and writeregisters. In response to receiving a Data packet containing a readregister command, firmware 24 directs device interface 22 to access a single register within I/O device 14 and transfer the contents thereof into the packet buffer of interface 22 for subsequent transfer to host 12. In response to receiving a readallregisters command from host 12, firmware 24 directs interface 22 to access several predetermined registers in I/O device 14 and transfer the contents thereof to the packet buffer of interface device 22 for subsequent transfer to host 12. The predetermined registers include one or more of those which contain cacheable data. In response to a writeregisters command, firmware 24 directs interface 22 to write to one or more registers using data stored in packet buffer.

Figure 4:
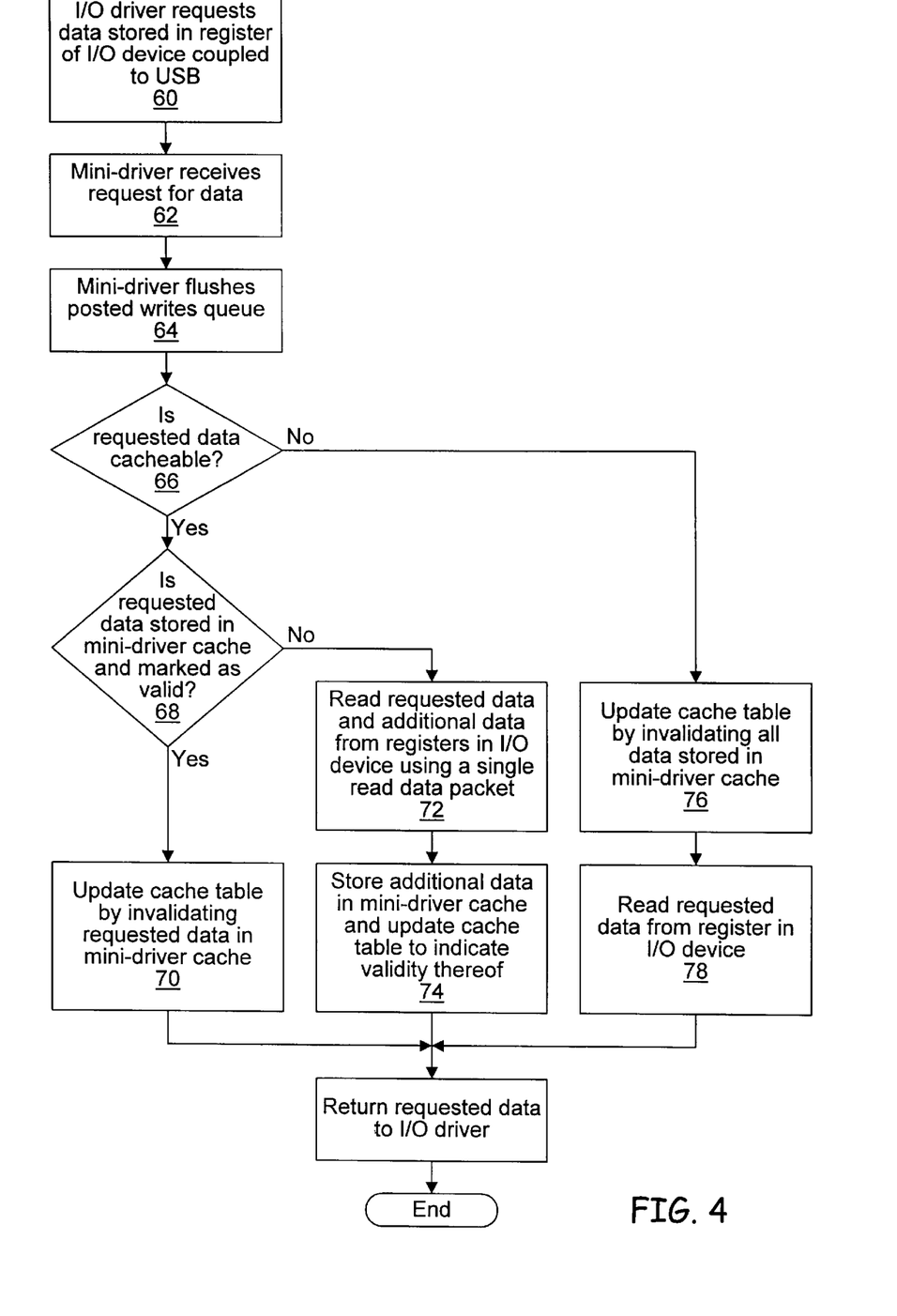
FIG. 4 is a flow chart illustrating operation of the invention employed in FIG. 3.

With reference to FIG. 4, the functional aspects of the USB based system shown in FIG. 3 will now be explained. In step 60, I/O driver 10, acting in response to application software 32, generates a request to read data stored in one of the registers of I/O device 14. USB mini-driver 40, in steps 62 and 64, immediately generates a flushpostedwrites command in response to receiving the I/O device request of step 60. The command instructs posted writes queue 46 to transfer all previously posted write requests to USB driver 16. Subsequently, USB driver 16 initiates a bus transaction which includes sending a Data packet having a writeregisters command and one or more address/data pairs provided by the posted writes flushed from queue 46. Interface 22 receives the Data packet and stores the address/data pair(s) in its packet buffer. Interface 22 then writes to I/O device registers in accordance with the writeregisters command using the data stored in packet buffer. It is to be noted that no further action is taken upon the I/O driver read request generated in step 60 until data is properly written to the I/O device registers.

In step 66, USB mini-driver 40 access cacheability LUT 48 using the I/O device register address of the read request generated in step 60. The present invention allows data requested by I/O driver 10 to be returned from cache 42. Thus, the present invention substantially increases the response time to I/O driver requests for data and reduces transactions over the USB 18 when compared with the prior art which requires a bus transaction to return the requested data from USB device 30.

However, as noted above, only cacheable data should be returned to I/O driver 10 via cache 42. Data from uncacheable registers must be returned directly from I/O device 14 upon I/O driver request. Cacheability LUT 48 is used to determine whether requested data is to be returned from cache 42 or from I/O device 14 via a bus transaction. If cacheability LUT 48 indicates that the data requested by I/O driver 10 is cacheable, the USB mini-driver will proceed to step 68 where it determines whether the requested data is available as valid data in cache 42. However, if cacheability LUT 48 indicates that the requested data is uncacheable, then a bus transaction must follow to retrieve the requested data directly from I/O device 14.

In step 68 USB mini-driver accesses cache table 44 using the I/O device register address of the read request. For each I/O register, table 44 indicates whether the requested data is available in cache 42. If available, cache table 44 also indicates whether the cached data is valid. When cache table 44 indicates the requested data is valid and available in cache 42, then USB mini-driver 40 immediately updates cache table 44 to indicate the requested data in cache 42 is no longer valid after the requested data is read from cache 42 as shown in step 70. The requested data is returned to I/O driver 10. However, if cache table 44 indicates the requested data is not available in cache 42, or the requested data is available but invalid, then the USB mini-driver, in step 72, initiates USB driver to retrieve the requested data from I/O device 14 along with data stored in one or more predetermined cacheable registers of I/O device 14. More particularly, USB driver 16 initiates a bus transaction which includes sending a Data packet containing the readallregisters to interface 22. In response to receiving the command, interface 22 accesses cacheable registers of I/O device 14 and returns data contained therein to host 12 in a second Data packet. In step 74, USB mini-driver 40 stores the returned data in cache 42 and updates table 44 to indicate the availability and validity of the data in cache 42. In this fashion, the read data cache 42 is provided with fresh register data for subsequent I/O driver read requests. The requested data is returned to the I/O driver 10.

Returning to step 66, if the cacheability LUT 48 indicates the requested data is stored in a noncacheable register, then in step 76, cache table 44 is updated to indicate that all data stored in cache 42 is invalid. Thereafter in step 78 USB mini-driver 40 prompts USB driver 16 to initiate a bus transaction which includes sending a Data packet containing the readregister command and the address of the register to be read. In response, device interface 22 accesses I/O device 14 and reads the requested data from the targeted register. Thereafter, device interface 22 returns the requested data to host computer 12 in a second Data packet. Alternatively, USB mini-driver 40 may prompt USB driver to send a Data packet with the readallregisters command. In response to receiving this command, device interface 22 accesses I/O device 14 and reads data from one or more predetermined cacheable registers including the data of the I/O device request. Thereafter, device interface 22 returns the requested data via USB 18 to the host computer 12, in a second Data packet. USB mini-driver 40 stores the return data in cache 42 and updates cache table 44 to indicate availability and validity of the newly stored data. The requested data is returned to the I/O driver 10.

Ultimately, the data requested by I/O driver 10 in step 60 is returned either from cache 42 or from I/O device 14 register via USB transaction. Clearly, the response time and amount of bus traffic is better when returning the data from cache 42 than returning data from I/O device 14.

Figure 5:
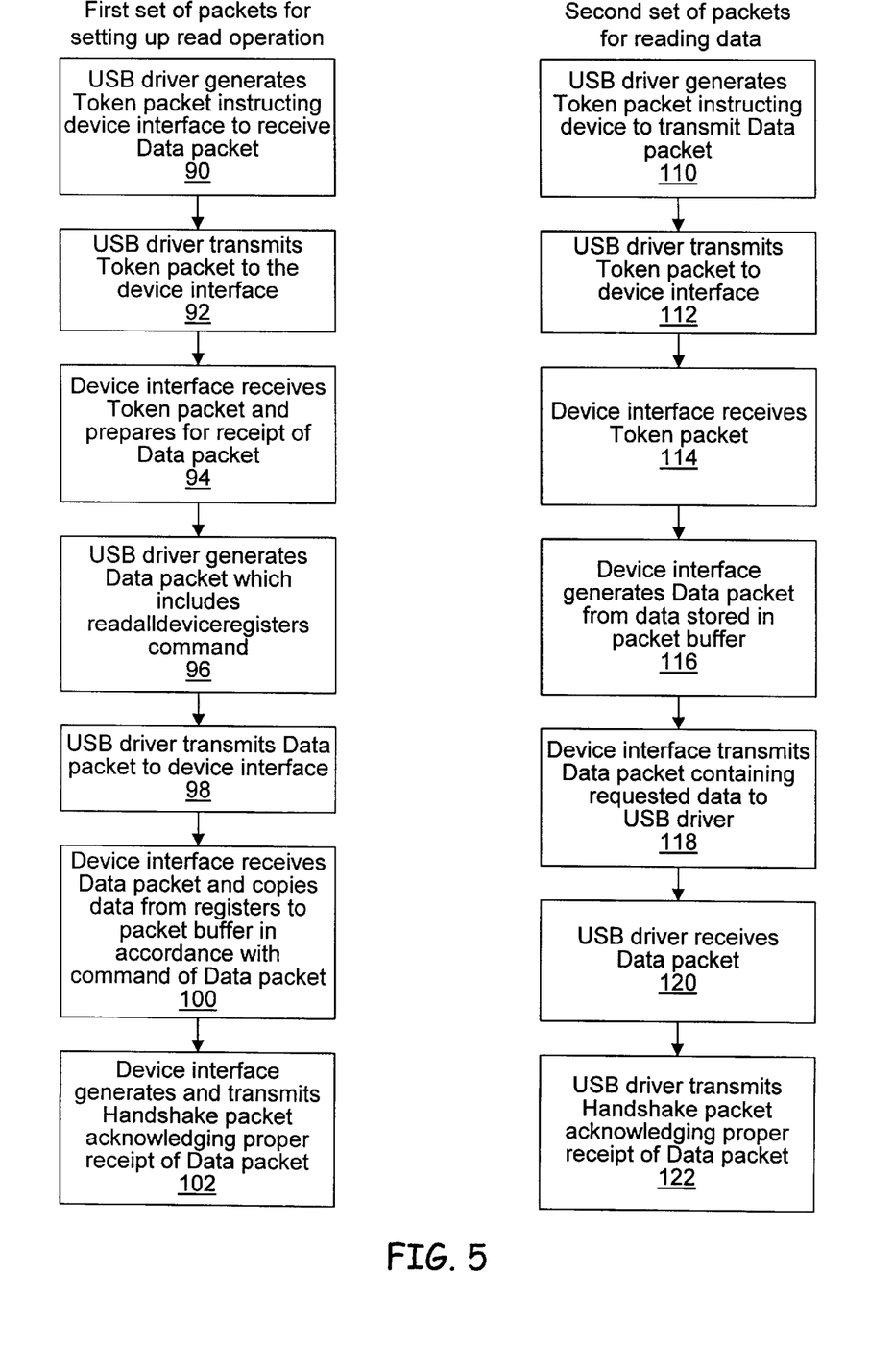
FIG. 5 is a flow chart illustrating operation of the USB driver of FIG. 3.

USB driver is configured to retrieve the requested data using the required USB protocol. With reference to FIG. 5, step 72 will be more fully described. Reading data from register of I/O device 14 involves two separate sets of USB packets. The first packet is used to provide interface 22 with necessary commands (e.g. readallregisters, readregister) for accessing registers of I/O device 14 and transferring the register contents to the packet buffer for subsequent return to host computer 12. To this end, USB driver 16 generates a Token packet instructing USB device 30 in general, and device interface 22 in particular, to receive a subsequent Data packet in step 90. The USB driver in step 92 transmits the Token packet over USB 18 to the interface 22 of USB device 30. Device interface 22 receives the Token packet and prepares for receipt of the subsequent Data packet in step 94. In step 96, USB driver 40 generates the Data packet containing the readallregister command. In step 98, the USB driver 16 transmits the Data packet to device interface 22. In step 100, device interface 22 receives the Data packet and, in cooperation with firmware 24, copies data from all cacheable registers of I/O device 14 into packet buffer of interface 22 in accordance with the readallregister command. Finally, in step 102, interface 22 generates and transmits a Handshake packet back to host computer 12 in general and USB driver 16 in particular, to acknowledge proper receipt of the Data packet.

The second set of packets allows the data stored within packet buffer to be transferred to host computer 12 via USB 18. In accordance thereto, USB driver first generates a Token packet instructing interface 22 to transmit the requested data in step 110. This Token packet is transmitted over USB 18 to the interface 22 in step 112. Interface 22 receives the Token packet in step 114 and, in step 116, constructs a Data packet using the data stored in its packet buffer. In step 118, the interface 22 transmits the Data pocket to the host computer 12. In step 120, the USB driver receives the Data packet containing the cacheable data and, in step 122, generates a Handshake packet to acknowledge proper receipt thereof. As noted above, received data is stored in cache 42 and table 44 is updated accordingly by USB mini-driver 40.

Figure 6:
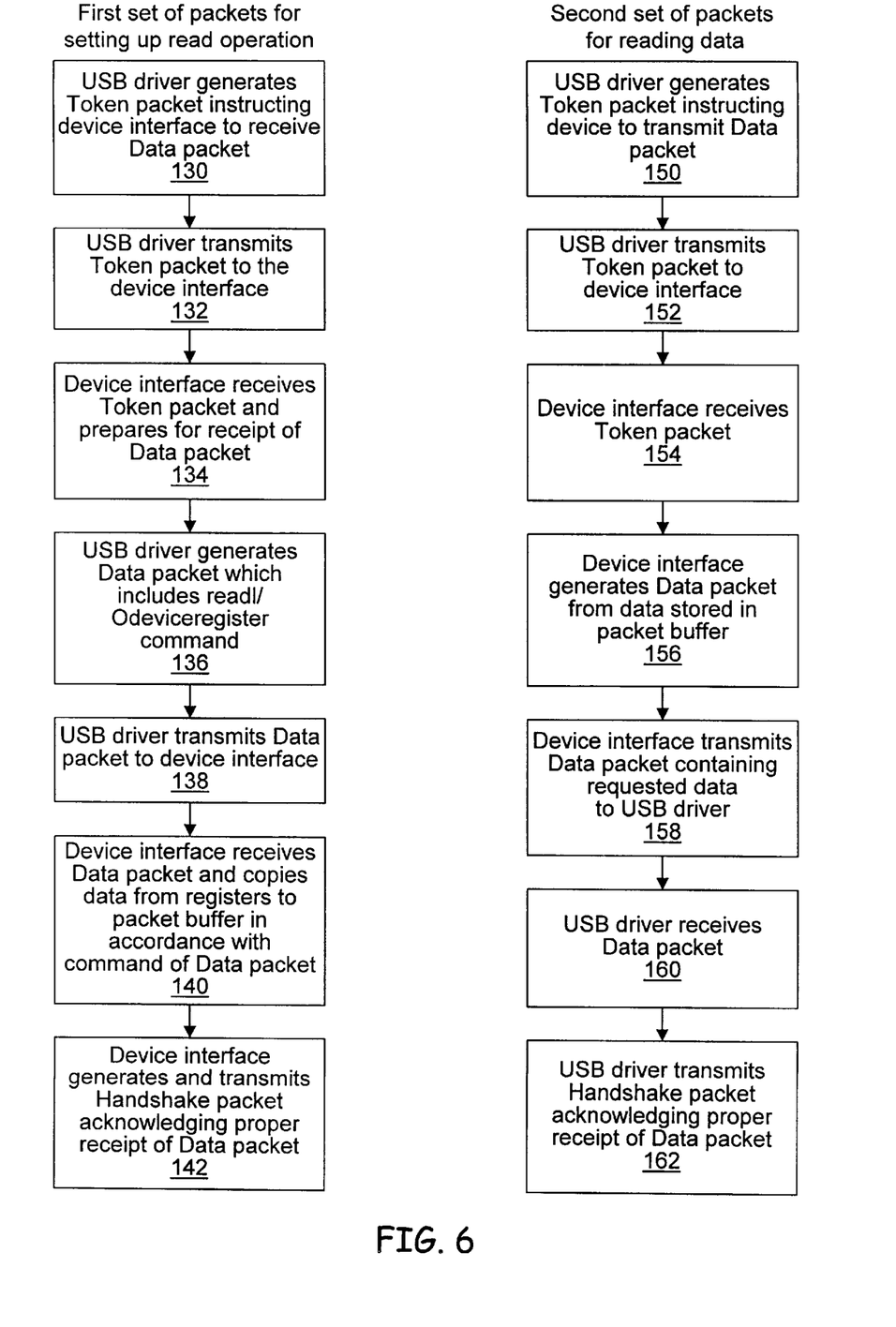
FIG. 6 is a flow chart illustrating operation of the USB driver of FIG. 3.

With reference to FIG. 6, the procedure for reading data from a single I/O device 14 register of step 78 in FIG. 4 will now be more fully described. As in FIG. 5, two sets of packets must be utilized to read data from the register of I/O device 14. In step 130, USB driver 16 generates a Token packet instructing the USB device 30 in general, and interface 22 in particular to accept a Data packet. In step 132, USB driver 16 transmits the Token packet to interface 22 via USB 18. In step 134, interface 22 receives the Token packet and prepares itself for receipt of the subsequent Data packet. USB driver generates the Data packet which includes the readI/Oregister command in step 136. In step 138, USB driver 16 transmits the Data packet to the interface 22 via USB 18. In step 140, interface 22 receives the Data packet and, in cooperation with firmware 24, copies the requested data from the targeted I/O device register into the packet buffer in accordance with the readregister command. Interface 22 then generates and transmits a Handshake packet back to host computer 12 acknowledging proper receipt of the previously sent Data packet.

With the requested data now stored in the packet buffer, the USB driver 16 initiates the second set of packets for returning the requested data back to host computer 12. In step 150, USB driver 16 generates a second Token packet which instructs USB device 30 to transmit the data contained in its packet buffer. In step 152, USB driver 16 transmits the Token packet over USB 18 to interface 22. In steps 154 and 156, interface 22 receives the Token packet and generates the necessary Data packet for sending the requested data back to host computer 12. In step 158, interface 22 transmits the Data packet via USB 18 to host computer 12. In steps 160 and 162, the USB driver receives the Data packet from the interface 22 and acknowledges its receipt by issuing a Handshake packet.

The bus transaction of FIG. 5 involves reading several registers of I/O device 14 while the transaction of FIG. 6 involves reading data from a single register of the I/O device. Each of these transactions involves substantial system overhead. Namely, each transaction requires two sets of USB packets to read data from the I/O device regardless of whether it is data from one register or data from several registers. It should be noted that the system overhead involved in reading data from I/O device 14 is substantially the same for each transaction shown in FIGS. 5 and 6. However, since the transaction of FIG. 5 involves sending the contents of several registers while the transaction of FIG. 6 involves the sending of the contents of a single I/O device register, using the transaction method of FIG. 5 does not substantially increase system overhead.

The foregoing description of the invention is illustrative and explanatory thereof, and various changes in the methods and apparatus may be made without departing from the spirit of the invention as set forth in the following claims.

What is claimed is:

1. In a system including a host computer and I/O devices coupled to the host computer via a universal serial bus (USB), wherein said host computer generates requests to read data stored in the I/O devices, a method comprising the steps:

the host computer generating first request to read a first data stored in an I/O device at a first address;

the host computer generating a request on the USB to read the first data and additional data stored in the I/O device in response to generation of the first request;

the I/O device returning the first and additional data stored in the I/O device to the host computer via the USB in response to generation of the request to read the first data and the additional data;

providing the first data to the host computer after the I/O device returning the first and additional data, and;

storing the additional data in a data cache in the host computer after the I/O device returning the first and additional data.

2. The method of claim 1, wherein the host computer generating the request to read the first and additional data comprises:

the host computer constructing a first packet from the request to read the first and additional data stored in the I/O device, and;

the host computer transmitting the first packet over the USB to an I/O device interface in data communication with the I/O device;

wherein the I/O device returning the first and additional data to the host computer is performed in response to the I/O device interface receiving the first packet.

3. The method of claim 2 wherein the I/O device returning the first and additional data comprises:

the I/O device interface generating a second packet containing the first and additional;

the I/O device interface transmitting the second packet to the host computer.

4. The method of claim 3 wherein the first and additional data are stored in registers in the I/O device.

5. The method of claim 1 further comprising:

the host computer creating a data structure including information indicating cacheability of data stored in the I/O device, wherein the cacheability information in the data structure is accessible using addresses of data stored in the I/O device;

the host computer creating a cache table including information indicating availability and validity of data stored in the cache, wherein the availability and validity information in the cache table is accessible using addresses of data stored in the I/O device;

the host computer accessing the data structure using the first address to determine cacheablity of the first data stored in the I/O device after the host computer generating the first request;

the host computer accessing the cache table using the first address to determine whether the first data is available and valid in the data cache after the host computer generating the first request;

wherein the host computer generating the request to read the first data and the additional data is performed in response to (1) the data structure indicating the first data is cacheable and (2) the cache table indicating the first data is not available in the data cache as valid data.

6. The method of claim 1 further comprising:

the host computer creating a data structure including information indicating cacheability of data stored in the I/O device, wherein the cacheability information in the data structure is accessible using addresses of data stored in the I/O device;

the host computer creating a cache table including information indicating availability and validity data stored in the cache is valid, wherein the availability and validity information in the cache table is accessible using addresses of data stored in the I/O device;

the host computer generating a second request to read a second data stored in the I/O device at a second address after the host computer generating the first request;

the host computer accessing the data structure using the second address to determine the cacheablity of the second data stored in the I/O device;

the host computer accessing the cache table using the second address to determine whether the second data is available in the data cache as valid data after the host computer generating the first request;

reading the second data from the data cache when (1) the data structure indicates the second data is cacheable and (2) the cache table indicates the second data is available as valid data in the data cache.

7. The method of claim 6 further comprising updating the cache table to indicate invalidity of the second data stored in the data cache after the second data is read from the data cache.

8. The method of claim 1 further comprising:

the host computer creating a data structure including information indicating cacheability of data stored in the I/O device, wherein the cacheability information in the data structure is accessible using addresses of data stored in the I/O device;

the host computer generating a second request to read a second data stored in the I/O device at a second address after the host computer generating the first request;

the host computer accessing the data structure using the second address to determine whether the second data is cacheable after the host computer generating the first request;

the I/O device returning the second data stored in the I/O device to the host computer via the USB in response to the data structure indicating the second data is uncacheable.

9. The method of claim 8 further comprising:

the host computer creating a cache table including information indicating availability and validity data stored in the cache is valid, wherein the availability and validity information in the cache table is accessible using addresses of data stored in the I/O device;

updating the cache table to indicate that all data stored in the data cache is invalid in response to the data structure indicating the second data is uncacheable.

10. The method of claim 9 further comprising:

the host computer generating a request for reading data stored at predefined addresses in the I/O device in response to the data structure indicating the second data is uncacheable, wherein the data at predefined addresses includes the second data;

the I/O device returning the data stored at the predefined addresses to the host computer via the USB in response to generation of the request to read data stored at predefined addresses;

storing the data returned from the I/O device in the data cache subsequent to updating the cache table.

11. The method of claim 1 further comprising:

the host computer generating one or more requests to write data to the I/O device;

the host computer constructing a packet from the one or more requests to write data, wherein the requests to write data are stored in a queue, and;

the host computer transmitting the packet over the USB to an I/O device interface in data communication with the I/O device before returning the first and additional data to the host computer.

12. The method of claim 5 further comprising the host computer updating the cache table to indicate availability and validity of the additional data stored in the data cache.

13. In a system including a host computer and I/O devices coupled to the host computer via a universal serial bus (USB), wherein the host computer generates requests for reading data stored in the I/O devices, a method comprising the steps:

storing data read from the I/O device in a data cache;

creating a data structure including information indicating cacheability of data stored in the I/O device, wherein cacheability information in the data structure is accessible using addresses of data stored in the I/O device;

creating a cache table including information indicating availability and validity of data stored in the cache, wherein availability and validity information in the cache table is accessible using addresses of data stored in the I/O device;

the host computer generating a request to read data stored in an I/O device at an address;

accessing the data structure using the address to determine whether the requested data is cacheable;

accessing the cache table using the address to determine whether the requested data is available in the data cache as valid data;

reading the requested data from the data cache in response to (1) the data structure indicating the requested data is cacheable and (2) the cache table indicating the requested data is available in the data cache as valid data.

14. The method of claim 13 further comprising updating the cache table in response to reading the requested data from the data cache, wherein the cache table is updated to indicate that the requested data is no longer available in the data cache as valid data.

15. The method of claim 13 further comprising:

reading data stored at predefined addresses in the I/O device when the cache table indicates that the requested data is unavailable in the data cache, wherein the data stored at the predefined addresses includes the requested data;

storing data read from the I/O device in the data cache;

updating the cache table to indicate the availability and validity of the data stored in the data cache.

16. The method of claim 13 further comprising:

reading the requested data from the I/O device when the data structure indicates that the requested data is not cacheable;

updating the cache table to indicate invalidity of all data stored in the data cache.

17. The method of claim 13 further comprising:

reading data stored at predefined addresses in the I/O device when the data structure indicates that the requested data is not cacheable, wherein the data at the predefined addresses includes the requested data;

storing all data read from the I/O device in the data cache;

updating the cache table to indicate the availability and validity of the data stored in the data cache.

18. A universal serial bus system comprising:

a universal serial bus (USB) for transmitting data between devices connected thereto;

an I/O device coupled to the USB, the I/O device having addressable memory for storing data;

a host computer coupled to the USB, wherein the host computer includes a memory, wherein the host computer is configured to generate (1) a first request on the USB to read a first data stored at a first address in the I/O device, and (2) a request on the USB to read the first data and additional data stored in the I/O device, wherein the request to read the first data and the additional data is generated in response to generation of the first request;

wherein the I/O device is configured to return the requested first and additional data to the host computer via the USB in response to the host computer generating the request to read the first data and the additional data, and;

wherein the host computer includes a cache in the memory for storing the returned additional data, wherein the returned additional data is avaible for subsequent access by the host computer.

19. The system of claim 18:

wherein the host computer is configured to construct a first packet from the request to read the first data and the additional data;

wherein the host computer is configured to transmit the first packet over the USB to a I/O device interface in data communication with the I/O device;

wherein the I/O device is configured to return the first and additional data to the host computer in response to the I/O device interface receiving the first packet.

20. The system of claim 18 further comprising:

a data structure stored in memory of the host computer, wherein the data structure is configured to indicate cacheability of data stored in the I/O device, wherein the data structure is accessible using addresses of data stored in the I/O device;

a cache table stored in memory of the host computer, wherein the cache table is configured to indicate availability and validity of data stored in the cache, wherein the cache table is accessible using addresses of data stored in the I/O device;

wherein the host generates the request to read the first data and the additional data in response to the (1) the data structure indicating the first data is cacheable and (2) the cache table indicating the first data is not available as valid data in the cache.

21. The system of claim 20 wherein the host computer is configured to update the cache table to indicate availability and validity of the additional data stored in the data cache.

22. The system of claim 18 further comprising:

a data structure stored in memory of the host computer, wherein the data structure is configured to indicate cacheability of data stored in the I/O device, wherein the data structure is accessible using addresses of data stored in the I/O device;

a cache table stored in memory of the host computer, wherein the cache table is configured to indicate availability and validity of data stored in the cache, wherein the cache table is accessible using addresses of data stored in the I/O device;

wherein the host computer is configured to generate a second request to read a second data stored in the I/O device at a second address;

wherein the host computer is configured (1) to access the data structure using the second address to determine whether the second data is cacheable in the host computer cache, and (2) to access the cache table using the second address to determine whether the second data is available and valid in the host computer cache;

wherein the host computer is configured to read the second data from the host computer cache in response to (1) the data structure indicating the second data is cacheable and (2) the cache table indicating the second data is available and valid in the data cache.

23. The system of 22 wherein the host computer is configured to update the cache table to indicate invalidity of the second data stored in the data cache is invalid after the second data is read from the data cache.

24. The system of claim 18 further comprising:

a data structure stored in memory of the host computer, wherein the data structure is configured to indicate cacheability of data stored in the I/O device, wherein the data structure is accessible using addresses of data stored in the I/O device;

a cache table stored in memory of the host computer, wherein the cache table is configured to indicate availability and validity of data stored in the cache, wherein the cache table is accessible using addresses of data stored in the I/O device;

wherein the host computer is configured to generate a second request to read a second data stored in the I/O device at a second address;

wherein the USB interface is configured to access the data structure using the second address to determine whether the second data is cacheable;

wherein the I/O device is configured to return the second data to the host computer in response to the data structure indicating the second data to be uncacheable.

25. The system of claim 21 wherein host computer is configured to update the cache table to indicate availability and validity of the second additional data in the cache.

26. The system of claim 18:

wherein the host computer is configured to construct a packet from requests to write data to the I/O device, wherein the write data requests are stored in a queue of memory of the host computer, and;

wherein the host computer is configured to transmit the packet over the USB to an I/O device interface in data communication with the I/O device before the I/O device returns the first and additional data to the host computer.

27. The system at claim 18 wherein the first request is generated by a software application executing on the host computer and the request for the first data and the additional data is generated by a driver executing on the host computer.

28. The system of claim 18 wherein the I/O device includes registers for storing the first and additional data.

* * * * *